(12) United States Patent
Gerighausen

(10) Patent No.: US 8,002,920 B2
(45) Date of Patent: Aug. 23, 2011

(54) METHOD FOR WINDING UP AND SPLICING A STRUCTURAL TIRE PART HAVING A MATERIAL THICKNESS THAT VARIES FROM THE PERSPECTIVE OF THE CROSS-SECTIONAL PROFILE THEREOF

(75) Inventor: Martin Gerighausen, Barsinghausen (DE)

(73) Assignee: Continental Aktiengesellschaft, Hannover (DE)

( * ) Notice: Subject to any disclaimer, the term of this patent is extended or adjusted under 35 U.S.C. 154(b) by 1056 days.

(21) Appl. No.: 11/832,249

(22) Filed: Aug. 1, 2007

(65) Prior Publication Data

US 2007/0267126 A1   Nov. 22, 2007

Related U.S. Application Data

(63) Continuation of application No. PCT/EP2006/000674, filed on Jan. 26, 2006.

(30) Foreign Application Priority Data

Feb. 10, 2005 (DE) .......................... 10 2005 006 076

(51) Int. Cl.
*B29D 30/26* (2006.01)
*B29D 30/48* (2006.01)
(52) U.S. Cl. ..... 156/136; 156/414; 156/417; 156/421.8; 156/422
(58) Field of Classification Search .................. 156/136, 156/422, 414, 415, 417, 421.4, 421.8, 131, 156/132
See application file for complete search history.

(56) References Cited

U.S. PATENT DOCUMENTS

| | | | | |
|---|---|---|---|---|
| 3,485,692 A | * | 12/1969 | Frazier | 156/123 |
| 3,895,986 A | | 7/1975 | Komatsu et al. | |
| 4,229,246 A | * | 10/1980 | Vanderzee | 156/417 |
| 4,547,251 A | | 10/1985 | Landsness et al. | |
| 4,555,287 A | * | 11/1985 | Goodfellow | 156/127 |
| 4,614,562 A | | 9/1986 | Jones et al. | |
| 4,795,522 A | | 1/1989 | Orendorf et al. | |
| 5,486,261 A | * | 1/1996 | Kikuchi et al. | 156/422 |
| 6,234,227 B1 | * | 5/2001 | Bosseaux | 156/398 |

FOREIGN PATENT DOCUMENTS

| | | |
|---|---|---|
| EP | 1 418 043 | 5/2004 |
| JP | 2002 187218 | 7/2002 |
| WO | WO-01/39964 A1 * | 6/2001 |

OTHER PUBLICATIONS

English language abstract of JP 2002-187218.

* cited by examiner

*Primary Examiner* — Geoffrey L Knable
(74) *Attorney, Agent, or Firm* — Greenblum & Bernstein, P.L.C.

(57) ABSTRACT

A method for winding up and splicing a tire building component, comprising placing the tire building component on a winding drum having a winding drum main axis and an inclinationally-adjustable surface, which is adjustable in inclination relative to the winding drum main axis, rotating the winding drum to rotationally symmetrically wind up the tire building component, and splicing together free ends of the tire building component to form a closed ring.

14 Claims, 2 Drawing Sheets

METHOD FOR WINDING UP AND SPLICING A STRUCTURAL TIRE PART HAVING A MATERIAL THICKNESS THAT VARIES FROM THE PERSPECTIVE OF THE CROSS-SECTIONAL PROFILE THEREOF

CROSS REFERENCE TO RELATED APPLICATIONS

The present application is a continuation of International Application No. PCT/EP2006/000674 filed Jan. 26, 2006, which published as WO 2006/084581 A1 Aug. 17, 2006, the disclosure of which is expressly incorporated by reference herein in its entirety. Further, the present application claims priority under 35 U.S.C. §119 and §365 of German Application No. 10 2005 006 076.5 filed Feb. 10, 2005, the disclosure of which is expressly incorporated by reference herein in its entirety.

BACKGROUND OF THE INVENTION

1. Field of the Invention

The invention relates to a method and device for winding up and splicing a tire building component having a material thickness that varies in cross-sectional profile.

2. Description of Background Information

In tire production, tire building components are wound up on a winding drum and subsequently spliced together to form an annular component. For example, in U.S. Pat. No. 3,895,986, which concerns the production of a bead assembly comprising a bead filler and a bead core, winding up of a bead filler is shown. During the winding and subsequent automatic splicing of strip-like tire building components, there is repeatedly the problem that the material shrinks unevenly, as seen over the width. This applies in particular to so-called bead fillers, which have a cross-sectionally triangular profile. At present, compensation for the uneven shrinkage is provided in automatic machines for winding strip-like tire building components by a stretching device or by manual splice correction. However, the stretching device is relatively complex to produce and manual splice correction precludes automation.

SUMMARY OF THE INVENTION

The aim of the present invention is to provide a method and device by which the winding up and splicing together of a tire building component having a material thickness that varies in cross-sectional profile is performed in a simple way.

According to the invention, a method for winding up and splicing a tire building component having a material thickness that varies in cross-sectional profile, comprises:
  placing the tire building component on a winding drum having an inclinationally-adjustable surface, which can be adjusted in its inclination relative to the main axis of the winding drum to compensate for uneven material shrinkages of the tire building component,
  rotating the winding drum for rotationally symmetrical winding up of the tire building component, and
  splicing together the two free ends of the tire building component to form a closed ring.

One advantage of the invention is to be seen, in particular, in the fact that the winding up and splicing together of the tire building component is performed in a simple way by the method according to the invention, and as a result of which, this process can be easily automated. The inclinationally-adjustable surface is used to compensate for material shrinkages over the circumference of the tire building component, since the inclinationally-adjustable surface has a varying circumferential length, or a varying diameter. This compensates for circumferential contractions, which occur on account of the material properties of the tire building component. As a result of this compensation, opposite free ends of the tire building component lie directly one on top of the other and can be spliced together without any stretching devices.

According to a further aspect of the invention, the tire building component is a bead filler with a substantially triangular cross-sectional profile. Due to the triangular cross-sectional profile of the bead filler, relatively great material shrinkages occur in this component.

According to an additional aspect of the invention, the inclinationally-adjustable surface is rotationally symmetrical relative to the main axis of the winding drum and tapers conically toward the main axis. The conical form of the inclinationally-adjustable surface results in optimum compensation for the material shrinkages.

According to a further aspect of the invention, the inclinationally-adjustable surface is adjusted by an adjusting ring. With the adjusting ring, any desired fine adjustment can be performed in a simple way.

According to another aspect of the invention, the adjusting ring sets the inclination of the inclinationally-adjustable surface by a threaded connection. The threaded connection can be realized in a simple way inside the winding drum.

According to a further aspect of the invention, the inclinationally-adjustable surface is formed by pivoting segments, and the pivoting segments are adjusted synchronously in their inclination. The synchronous adjustment of the pivoting segments has the advantage that, in an adjustment, all the pivoting segments have the same angle of inclination.

According to a further aspect of the invention, the angle of inclination of the inclinationally-adjustable surface lies in a range of less than 10°. This angular range has proven to be particularly advantageous for the triangular bead filler.

According to an additional aspect of the invention, a method for winding up and splicing a tire building component, comprises placing the tire building component on a winding drum having a winding drum main axis and an inclinationally-adjustable surface, which is adjustable in inclination relative to the winding drum main axis, rotating the winding drum to rotationally symmetrically wind up the tire building component, and splicing together two free ends of the tire building component to form a closed ring.

According to another aspect of the invention, the tire building component comprises a material having a thickness that varies in a cross-sectional profile.

According to a further aspect of the invention, the placing step compensates for uneven material shrinkages of the tire building component.

According to an additional aspect of the invention, the tire building component comprises a bead filler having a substantially triangular cross-sectional profile.

According to another aspect of the invention, the inclinationally-adjustable surface is rotationally symmetrical to and conically tapered towards the winding drum main axis.

According to a further aspect of the invention, the method further comprises adjusting the inclinationally-adjustable surface by an adjusting ring.

According to another aspect of the invention, the adjusting ring adjusts the inclination of the inclinationally-adjustable surface through a threaded connection.

According to a further aspect of the invention, the inclinationally-adjustable surface comprises pivoting segments and an inclination of the pivoting segments are adjusted synchronously.

According to an additional aspect of the invention, an angle of inclination of the inclinationally-adjustable surface is adjustable within a range of less than 10°.

According to a further aspect of the invention, the method further comprises turning up the tire building component.

According to another aspect of the invention, a device for winding up and splicing a tire building component, comprises a winding drum including a main axis, pivoting segments, and an inclinationally-adjustable surface, wherein an inclination of the inclinationally-adjustable surface is adjustable relative to the main axis to compensate for uneven material shrinkages of the tire building component.

According to a further aspect of the invention, the inclinationally-adjustable surface is structured and arranged to accommodate the tire building component having a material thickness that varies in a cross-sectional profile.

According to an additional aspect of the invention, the inclinationally-adjustable surface is rotationally symmetrical to and conically tapered towards the winding drum main axis.

According to another aspect of the invention, the device further comprises an adjusting ring, wherein an inclination of the inclinationally-adjustable surface is adjustable by the adjusting ring.

According to a further aspect of the invention, the device further comprises a threaded connection, wherein the adjusting ring adjusts the inclination of the inclinationally-adjustable surface through the threaded connection.

According to an additional aspect of the invention, the inclinationally-adjustable surface comprises pivoting segments, wherein an inclination of the pivoting segments are adjusted synchronously.

According to another aspect of the invention, an inclination of the inclinationally adjustable surface is adjustable within a range of less than 10°.

According to an additional aspect of the invention, a pneumatic cylinder is structured and arranged to bring about a turning up of the tire building component.

According to a further aspect of the invention, a vehicle tire with tire building components is produced by a method comprising placing the tire building component on a winding drum having a winding drum main axis and an inclinationally-adjustable surface, which is adjustable in inclination relative to the winding drum main axis, rotating the winding drum to rotationally symmetrically wind up the tire building component, and splicing together two free ends of the tire building component to form a closed ring.

BRIEF DESCRIPTION OF THE DRAWINGS

The present invention is further described in the detailed description on the basis of an exemplary embodiment, wherein.

DETAILED DESCRIPTION OF THE INVENTION

Figure 1:
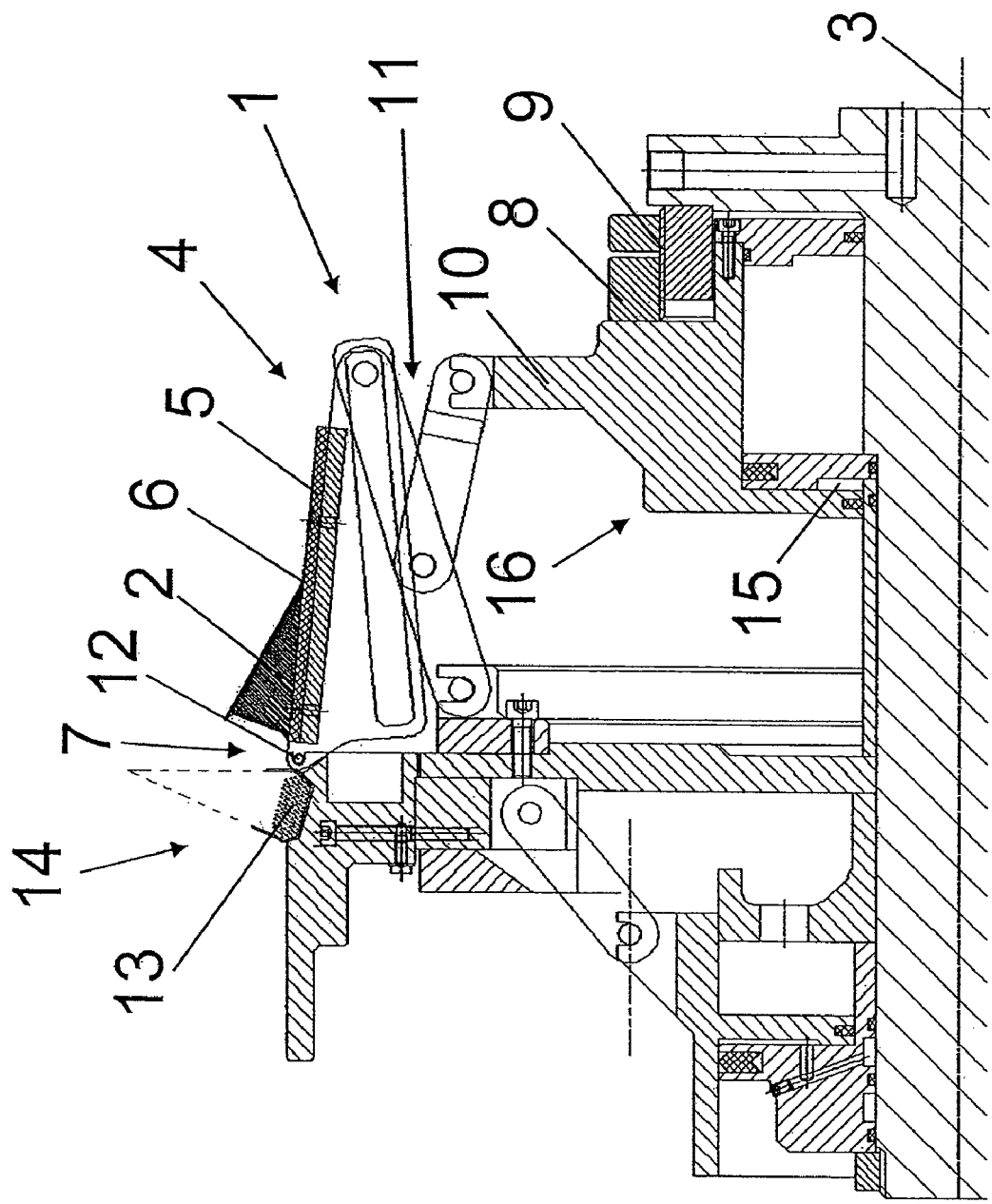
FIG. 1 shows a sectional representation of the winding drum for winding up a bead filler.

FIG. 1 shows a sectional representation of the winding drum 1 for winding up a bead filler 2. The represented components of the winding drum 1 are rotationally symmetrical in relation to the main axis 3 of the winding drum 1. The bead filler 2 may be composed of an elastomer material and has a material thickness that varies in cross-sectional profile. Moreover, the bead filler 2 can have a triangular cross-sectional profile and may be wound up in a lying state on pivoting segments 4. The bead filler 2 may be fed by way of a servicer (not shown) to the winding drum 1, and can be subsequently placed on pivoting segments 4.

The winding-up operation is subsequently performed, in that the winding drum 1 rotates about the main axis 3. After a cutting-to-length of the bead filler 2 in the form of a double oblique cut, two free ends (not shown) of the bead filler 2 are connected, or spliced together, on the winding drum 1, such that the bead filler 2 forms a closed ring.

The pivoting segments 4 (only one represented in the figures), form by way of their outer circumference the inclinationally-adjustable surface 5. The inclinationally-adjustable surface 5 is rotationally symmetrical in relation to the main axis 3 and has a three-dimensional conical surface. The inclinationally-adjustable surface 5 provides a winding circumference that is smaller in a tip region 6 of the bead filler 2, thereby compensating for differences in diameter of the overall bead filler 2.

These differences in diameter of the bead filler 2 can be caused by material shrinkages, which bring about a smaller diameter at the tip region 6 than at the opposite material thickening region 7 of the bead filler 2. The resulting material shrinkage over the circumference of the bead filler 2 may be attributable, in particular, to the plastic-elastic material properties and the varying material thickness of the bead filler 2. These factors have the consequence that the bead filler 2 shrinks together more over the circumference at the tip region 6 than at the opposite material thickening region 7.

The inclinationally-adjustable surface 5 is then set in its angle of inclination with respect to the main axis 3 so as to compensate for the material shrinkage. In this way, the free ends of the bead filler 2 can be placed in a substantially plane-parallel manner one on top of the other in an automated process, without additional stretching devices, and subsequently be spliced together.

The inclinationally-adjustable surface 5 is adjusted by an adjusting ring 8, which is likewise arranged rotationally symmetrically relative to the main axis 3. The adjusting ring 8 moves parallel to the main axis 3, via a rotational movement with a threaded connection 9, whereby a component 10 is likewise moved parallel to the main axis 3. In this way, a pivoting mechanism 11 is moved such that the inclination of the inclinationally-adjustable surface 5 is adjusted through a pivot point 12, whereby a steeper or shallower angle of inclination is set. An angle of inclination of the inclinationally-adjustable surface 5 lies in a range of less than 10° relative to the main axis 3.

After the winding up and splicing of the bead filler 2, a turning up is performed by the pivoting segments 4. The turning up brings about a positioning the bead filler 2 (as represented by hidden lines in FIG. 1), while at the same time connecting the bead filler 2 to the bead core 13 to produce the bead assembly 14 (represented in FIG. 1). The turning up of the pivoting segments 4 is performed by blowing compressed air into a hollow space 15 of a pneumatic cylinder 16.

Figure 2:
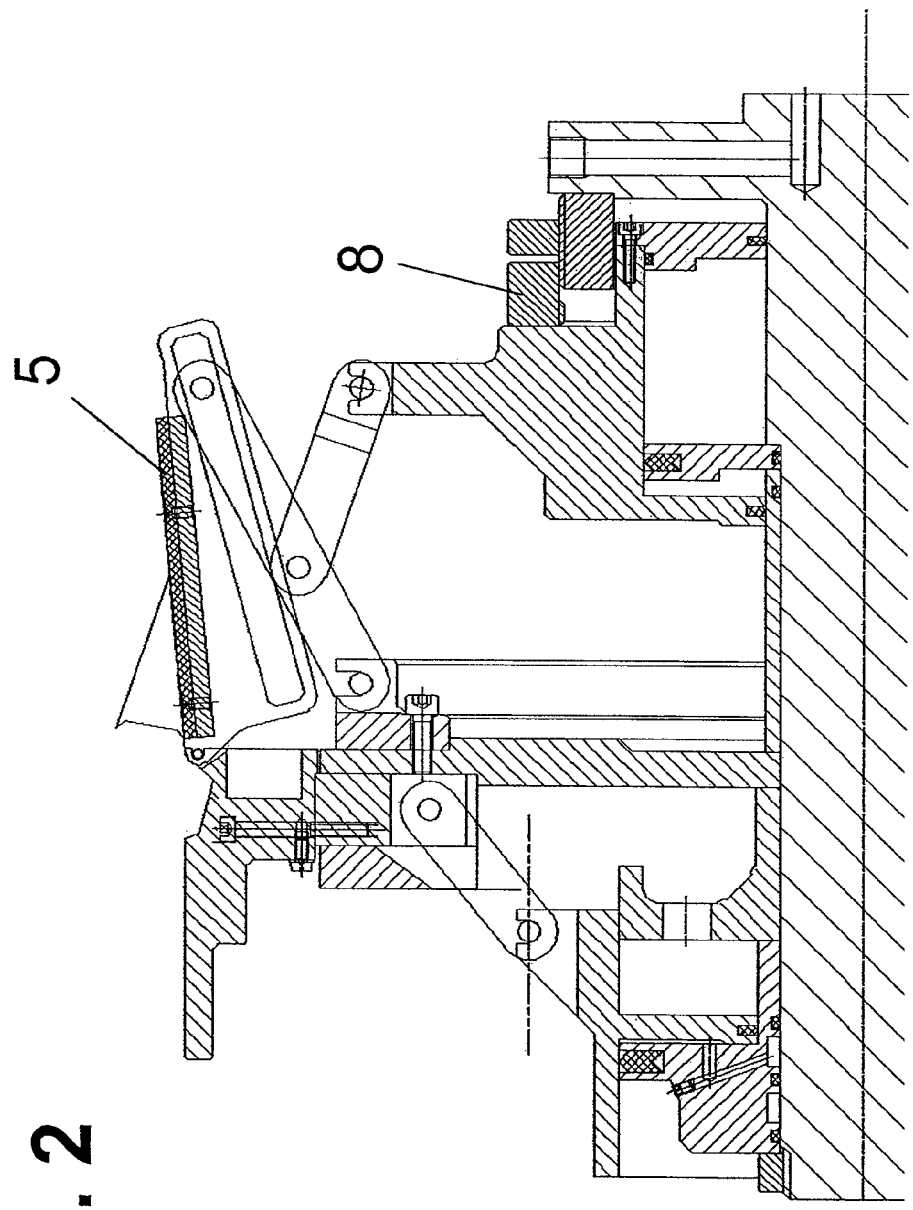
FIG. 2 shows a sectional representation of the winding drum, the inclinationally-adjustable surface having been adjusted in its inclination by the adjusting ring.

FIG. 2 shows the adjusting ring 8 in a position shifted further to the left of the figure (as compared with FIG. 1), whereby the angle of inclination of the inclinationally-adjustable surface 5 is changed. The angle of inclination of the inclinationally-adjustable surface 5 can be finely adjusted by the adjusting ring 8. The optimum setting of the inclinationally-adjustable surface 5 is dependent, inter alia, on material parameters of the bead filler 2.

LIST OF DESIGNATIONS (Forming Part of the Description)
1 Winding drum
2 Bead filler
3 Main axis of the winding drum
4 Pivoting segments
5 Inclinationally-adjustable surface
6 Tip region of the bead filler
7 Material thickening region of the bead filler
8 Adjusting ring
9 Threaded connection
10 Component
11 Pivoting mechanism
12 Pivot point
13 Bead core
14 Bead assembly
15 Hollow space
16 Pneumatic cylinder

What is claimed is:

1. A method for winding up and splicing a tire building component, comprising:
    placing the tire building component on a winding drum comprising:
        a winding drum main axis and an inclinationally-adjustable surface, which is adjustable in inclination relative to the winding drum main axis, wherein the tire building component is placed on the inclinationally-adjustable surface;
        a pneumatic cylinder mechanically coupled to the inclinationally-adjustable surface and structured and arranged to move the inclinationally-adjustable surface to bring about a turning up of the tire building component upon a pneumatic actuation; and
        an adjusting ring abutting the pneumatic cylinder, and in direct engagement with a threaded connection, which is structured and arranged to move the pneumatic cylinder to adjust the angle of the inclinationally-adjustable surface relative to the main axis independent of the pneumatic actuation to compensate for uneven material shrinkages of the tire building component;
    adjusting the inclinationally-adjustable surface by the adjusting ring in direct engagement with the threaded connection independent of the pneumatic actuation to compensate for uneven material shrinkages of the tire building component;
    rotating the winding drum to rotationally symmetrically wind up the tire building component; and
    splicing together free ends of the tire building component to form a closed ring.

2. The method of claim 1, wherein the tire building component comprises a material having a thickness that varies in a cross-sectional profile.

3. The method of claim 1, wherein the tire building component comprises a bead filler having a substantially triangular cross-sectional profile.

4. The method of claim 1, wherein the inclinationally-adjustable surface is rotationally symmetrical to and conically tapered towards the winding drum main axis.

5. The method of claim 1, wherein the adjusting ring adjusts the inclination of the inclinationally-adjustable surface through the threaded connection.

6. The method of claim 1, wherein the inclinationally-adjustable surface comprises pivoting segments, and
    wherein an inclination of the pivoting segments are adjusted synchronously.

7. The method of claim 1, further comprising turning up the tire building component.

8. The method of claim 1, wherein an angle of inclination of the inclinationally-adjustable surface is adjustable via the adjusting ring within a range of less than 10°.

9. A device for winding up and splicing a tire building component, comprising:
    a winding drum including a main axis, and an inclinationally-adjustable surface structured and arranged for supporting the tire building component;
    a pneumatic cylinder mechanically coupled to the inclinationally-adjustable surface and structured and arranged to move the inclinationally-adjustable surface to bring about a turning up of the tire building component upon a pneumatic actuation; and
    an adjusting ring abutting the pneumatic cylinder, and in direct engagement with a threaded connection, which is structured and arranged to move the pneumatic cylinder to adjust the angle of the inclinationally-adjustable surface relative to the main axis independent of the pneumatic actuation to compensate for uneven material shrinkages of the tire building component.

10. The device of claim 9, wherein the inclinationally-adjustable surface is structured and arranged to accommodate the tire building component having a material thickness that varies in a cross-sectional profile.

11. The device of claim 9, wherein the inclinationally-adjustable surface is rotationally symmetrical to and conically tapered towards the winding drum main axis.

12. The device of claim 9, wherein the adjusting ring adjusts the inclination of the inclinationally-adjustable surface through the threaded connection.

13. The device of claim 9, wherein the inclinationally-adjustable surface comprises pivoting segments, and wherein an inclination of the pivoting segments are adjusted synchronously.

14. The device of claim 9, wherein an angle of inclination of the inclinationally-adjustable surface is adjustable via the adjusting ring within a range of less than 10°.

* * * * *